United States Patent
Fridman et al.

(10) Patent No.: US 7,525,930 B2
(45) Date of Patent: Apr. 28, 2009

(54) SYSTEM AND METHOD FOR USER IDENTITY PORTABILITY IN COMMUNICATION SYSTEMS

(75) Inventors: Sharon Fridman, London (GB); Ben Volach, Richmond (GB); Ran Makavy, Sterling, VA (US)

(73) Assignee: NeuStar, Inc., Sterling, VA (US)

( * ) Notice: Subject to any disclaimer, the term of this patent is extended or adjusted under 35 U.S.C. 154(b) by 0 days.

(21) Appl. No.: 11/840,859

(22) Filed: Aug. 17, 2007

(65) Prior Publication Data
US 2008/0130523 A1 Jun. 5, 2008

Related U.S. Application Data

(60) Provisional application No. 60/838,159, filed on Aug. 17, 2006.

(51) Int. Cl.
H04L 12/16 (2006.01)
(52) U.S. Cl. ............... 370/259; 370/254; 370/331; 370/465; 455/436; 455/414; 455/417; 455/426
(58) Field of Classification Search ............ 370/259, 370/254, 409, 338, 353, 352
See application file for complete search history.

(56) References Cited

U.S. PATENT DOCUMENTS

| 7,281,137 | B1 * | 10/2007 | Vitikainen | ............ 713/189 |
| 2002/0016164 | A1 | 2/2002 | Mead et al. | |
| 2005/0237978 | A1 | 10/2005 | Segal | |
| 2006/0239206 | A1 * | 10/2006 | Rao et al. | ............ 370/254 |

OTHER PUBLICATIONS

International Search Report regarding International Application No. PCT/US07/18294 completed May 30, 2008 and mailed on Jul. 17, 2008.

* cited by examiner

*Primary Examiner*—David Q Nguyen
(74) *Attorney, Agent, or Firm*—Katten Muchin Rosenman LLP

(57) ABSTRACT

Exemplary embodiments of the present invention are directed to a system and method for user identity portability in communication systems. The present invention can provide user identity portability across communication networks that do not necessarily impose a phone number as the identity, addressing, or routing identifier. According to exemplary embodiments, a user identified by any suitable user identifier can switch network operators (e.g., from operator A to operator B) and retain their user identifier. For example, an identity server can support reverse lookup ENUM usage for URI and other identity correlation. Thus, all communication contacts that the user had while with operator A can seamlessly continue communications with the user even after the user switches to operator B.

24 Claims, 6 Drawing Sheets

SYSTEM AND METHOD FOR USER IDENTITY PORTABILITY IN COMMUNICATION SYSTEMS

The present application claims priority under 35 U.S.C. § 119(e) to U.S. Provisional Application No. 60/838,159, filed on Aug. 17, 2006, the entire contents of which are hereby incorporated by reference herein.

BACKGROUND

1. Field of the Invention

The present invention relates to communication systems. More particularly, the present invention relates to a system and method for user identity portability in communication systems.

2. Background Information

Number portability can be used in telecommunications to allow users to move or otherwise switch operators and retain their phone number. For example, in a mobile network, a user with a particular Mobile Station International Subscriber Directory Number (MSISDN) can switch telecommunication services from one Mobile Network Operator (MNO) to another MNO, and retain their MSISDN. An "operator" is a network operator that provides communication capabilities in fixed, mobile, converged, or other appropriate types of networks. The operators offer services with suitable service enablers that provide the communication services to users. Users "belong" or subscribe to or are otherwise affiliated with the operators, and consume communication services using the respective operator's service enablers.

An ENUM (tElephone NUmber Mapping) server provides the ability to map E.164 phone numbers to a corresponding Uniform Resource Identifier (URI). Such telephone number mapping is described in, for example, Internet Engineering Task Force (IETF), Network Working Group, Request for Comments (RFC) 3761, "The E.164 to Uniform Resource Identifier (URI) Dynamic Delegation Discovery System (DDDS) Application (ENUM)" (April 2004). E.164 phone numbering is described in, for example, Telecommunication Standardization Section of International Telecommunication Union (ITU-T) Recommendation E.164, "The International Public Telecommunication Numbering Plan" (February 2005).

Different services allow mapping to different forms of URIs, such as, for example, Session Initiation Protocol (SIP) URIs, Presence URIs, Instant Messaging (IM) URIs, Simple Mail Transfer Protocol (SMTP) URIs, and the like. For example, SIP URIs are discussed in IETF, Network Working Group, RFC 3969, "The Internet Assigned Number Authority (IANA) Uniform Resource Identifier (URI) Parameter Registry for the Session Initiation Protocol (SIP)" (December 2004). Presence URIs are discussed in, for example, IETF, Network Working Group, RFC 3953, "Telephone Number Mapping (ENUM) Service Registration for Presence Services" (January 2005), and Presence and IM URIs are discussed in, for example, IETF, Network Working Group, RFC 3861, "Address Resolution for Instant Messaging and Presence" (August 2004). Telephone URIs are discussed in, for example, IETF, Network Working Group, RFC 3966, "The tel URI for Telephone Numbers" (December 2004). Additionally, "eXtensible Resource Identifier" ("XRI") is a scheme and resolution protocol for abstract identifiers developed by the XRI Technical Committee at the Organization for the Advancement of Structured Information Standards (OASIS) that can use, for example, "i-names" as user-friendly identifiers. Such mapping allows communication services that are based on phone numbers (e.g., MSISDN) to locate the corresponding URI. If the user retains their MSISDN when switching operators, the updated URI can reflect the correct addressing for the given user. Consequently, service enablers or mediation servers (such as messaging enablers) that consult or otherwise query the ENUM server can correctly route a message to the target, even if the user has switched operators.

For example, FIG. 1 is a diagram illustrating a message flow for a communication transaction between User A and User B belonging to different operators. In FIG. 1, User A desires to send a communication to User B at a certain MSISDN. In step 1, the communication is transmitted to the service enabler 105 for User A, including the destination information (User B at MSISDN). In step 2, the service enabler 105 determines that User B is a remote user (e.g., based on the MSISDN of User B). Accordingly, in step 3, the service enabler 105 initiates a search for address information for User B by forwarding an appropriate query (with the MSISDN of User B) to an interconnection node 110 that interconnects the networks of the operators for User A and User B. To resolve the query, the interconnection node 110 sends an ENUM query (with the MSISDN of User B) to ENUM server 115 in step 4. In response, the ENUM server 115 returns the URI of User B back to the interconnection node 110 in step 5. In step 6, the interconnection node 110 sends a request to the ENUM server 115 to resolve the domain of User B with the returned URI. In step 7, the ENUM server 115 responds with the IP address of the service enabler 120 of User B. Using such address information, the interconnection node 110 can forward User A's communication (with the URI of User B) to the service enabler 120 of User B in step 8. In step 9, the service enabler 120 for User B can forward the communication to User B at the indicated URI. Accordingly, User B can change operators, and User A can still communicate with User B if User A knows the MSISDN of User B.

The communication services provided by operators can incorporate communication contacts that identify the user with a known network identity to allow third parties to contact the user. However, if a user switches operators (and, for example, switches telephone numbers), then the user may need to change their network identity. Therefore, there is a need to allow a user to switch operators and retain their network identity.

SUMMARY OF THE INVENTION

A system and method are disclosed for user identity portability in communication systems. In accordance with exemplary embodiments of the present invention, according to a first aspect of the present invention, a system for identity portability across communication systems includes a user communication module. The user communication module is configured to utilize a first communication service provided by a first communication service operator. A network identity is associated with the user communication module. A first network address is associated with the network identity for addressing communications to the network identity via the first communication service. The user communication module is switched to utilize a second communication service provided by a second communication service operator. A second network address is associated with the network identity for addressing communications to the network identity via the second communication service. The system includes an identity management server module in communication with the user communication module. The identity management server module is configured to map the first network address to the second network address for communications addressed to the network identity at the first network address.

According to the first aspect, the first network address can comprise a previous network address associated with the network identity, and the second network address can comprise a current network address associated with the network identity. The identity management server module can include a network identity mapping module. The network identity mapping module can be configured to correlate the first network address with the second network address for each network identity. The identity management server module can include a storage module. The storage module can be configured to store mappings of the first network address to the second network address for each network identity. The identity management server module can include a preference management module. The preference management module can be configured to manage preferences associated with users of the system. The identity management server module can also include a communication module. The communication module can be configured to communicate network address information associated with each network identity.

According to the first aspect, the identity management server module can be configured to return the second network address of the network identity when queried with the first network address of the network identity. A communication contact for the network identity can be updated with the returned second network address. According to an exemplary embodiment of the first aspect, the returned second network address need not include an indication of the network identity associated with the second network address. The identity management server module can be configured to block mapping of the first network address to the second network address to maintain privacy of the network identity after switching to the second communication service provided by the second communication service operator. The system can include a communication server module in communication with the identity management server module. The communication server module is configured to query the identity management server module for network address information associated with the network identity. The network identity can comprise one of, for example, a Session Initiation Protocol (SIP) Uniform Resource Identifier (URI), an E.164 number, a Mobile Station International Subscriber Directory Number (MSISDN), a presence URI, an instant messaging (IM) URI, an eXtensible Resource Identifier (XRI) i-name, a Wireless Village ID, and an Extensible Messaging and Presence Protocol (XMPP) ID, or other suitable identifier. Either or both of the first and second network addresses can comprise, for example, a Uniform Resource Identifier (URI) or other like network address.

According to a second aspect of the present invention, an apparatus for network identity portability includes an identity management server. The identity management server is adapted to communicate with a user communication device. The user communication device is adapted to utilize communication services of a first communication network. A network identity is associated with the user communication device. A first network address is associated with the network identity for addressing communications to the network identity via the first communication network. The user communication device is switched to utilize communication services of a second communication network. A second network address is associated with the network identity for addressing communications to the network identity via the second communication network. The identity management server includes identity mapping structure. The identity mapping structure is adapted to correlate the first network address to the second network address for communications addressed to the network identity at the first network address.

According to the second aspect, the first network address can comprise a previous network address associated with the network identity, and the second network address can comprise a current network address associated with the network identity. The identity mapping structure can include identity preference management structure. The identity preference management structure is adapted to manage preference information associated with network identities. The identity mapping structure can include an identity information database. The identity information database can be adapted to store information associated with network identities. The identity management server can include identity communication structure in communication with the identity mapping structure. The identity communication structure can be adapted to communicate information associated with network identities.

According to a third aspect of the present invention, a method of porting network identities across communication systems includes the steps of: assigning a network identity to a user, wherein the user communicates information utilizing a first communication service provided by a first communication service operator; associating a first network address with the network identity for addressing communications to the network identity via the first communication service; switching from the first communication service provided by the first communication service operator to a second communication service provided by a second communication service operator; associating a second network address with the network identity for addressing communications to the network identity via the second communication service; and mapping the first network address to the second network address for communications addressed to the network identity at the first network address.

According to the third aspect, the first network address can comprise a previous network address associated with the network identity, and the second network address can comprise a current network address associated with the network identity. The method can include one or more of the following steps: correlating the first network address with the second network address for network identities; storing mappings of the first network address to the second network address for network identities; managing preferences associated with users of the system; communicating network address information associated with network identities; and returning the second network address of the network identity when queried with the first network address of the network identity. A communication contact for the network identity can be updated with the returned second network address. The returned second network address need not include an indication of the network identity associated with the second network address. The method can include the step of: blocking mapping of the first network address to the second network address to maintain privacy of the network identity after switching to the second communication service provided by the second communication service operator. The method can also include the step of: generating a query for network address information associated with the network identity. According to an exemplary embodiment of the third aspect, the network identity can comprise one of, for example, a SIP URI, an E.164 number, a MSISDN, a presence URI, an IM URI, an XRI i-name, a Wireless Village ID, an XMPP ID, or other suitable identifier. At least one of the first and second network addresses can comprise, for example, a URI or other like network address.

According to a fourth aspect of the present invention, a system for identity portability across communication systems includes a communication unit. The communication unit is configured to utilize a first communication service provided by a first communication service operator. A network identity is associated with the communication unit. A first network address is associated with the network identity for addressing communications to the network identity via the first communication service. The communication unit is switched to utilize a second communication service provided by a second communication service operator. A second network address is associated with the network identity for addressing communications to the network identity via the second communication service. The system includes means for managing network identity in communication with the communication unit. The network identity managing means is configured to map the first network address to the second network address for communications addressed to the network identity at the first network address.

According to the fourth aspect, the first network address can comprise a previous network address associated with the network identity, and the second network address can comprise a current network address associated with the network identity. The network identity managing means can include means for network identity mapping. The network identity mapping means can be configured to correlate the first network address with the second network address for each network identity. The network identity managing means can include means for storing information. The information storing means can be configured to store mappings of the first network address to the second network address for each network identity. The network identity managing means can include means for managing preferences. The preference managing means is configured to manage preferences associated with users of the system. The network identity managing means can include means for communicating information. The information communicating means can be configured to communicate network address information associated with each network identity. The network identity managing means can be configured to return the second network address of the network identity when queried with the first network address of the network identity. A communication contact for the network identity can be updated with the returned second network address. According to an exemplary embodiment of the fourth aspect, the returned second network address need not include an indication of the network identity associated with the second network address. The network identity managing means can be configured to block mapping of the first network address to the second network address to maintain privacy of the network identity after switching to the second communication service provided by the second communication service operator. The system can include means for interconnecting communications in communication with the network identity managing means. The communication interconnecting means can be configured to query the network identity managing means for network address information associated with the network identity. The network identity can comprise one of, for example, a SIP URI, an E.164 number, a MSISDN, a presence URI, an IM URI, an XRI i-name, a Wireless Village ID, an XMPP ID, or other like identifier. One or both of the first and second network addresses can comprise, for example, a URI or other like network address.

According to a fifth aspect of the present invention, an apparatus for network identity portability includes means for managing identity information. The identity information managing means is adapted to communicate with a user communication device. The user communication device is adapted to utilize communication services of a first communication network. A network identity is associated with the user communication device. A first network address is associated with the network identity for addressing communications to the network identity via the first communication network. The user communication device is switched to utilize communication services of a second communication network. A second network address is associated with the network identity for addressing communications to the network identity via the second communication network. The identity information managing means includes means for mapping identity information. The identity information mapping means is adapted to correlate the first network address to the second network address for communications addressed to the network identity at the first network address.

According to the fifth aspect, the first network address can comprise a previous network address associated with the network identity, and the second network address can comprise a current network address associated with the network identity. The identity information mapping means can include means for managing identity preferences. The identity preference managing means can be adapted to manage preference information associated with network identities. The identity information mapping means can include means for storing identity information. The identity information storing means can be adapted to store information associated with network identities. The identity information managing means can include means for communicating identity information in communication with the identity information mapping means. The identity information communicating means can be adapted to communicate information associated with network identities.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a system and method for user identity portability in communication systems. The present invention can provide user identity portability across communication networks that do not necessarily impose a phone number as the identity, addressing, or routing identifier. According to exemplary embodiments, a user identified by any suitable user identifier can switch network operators (e.g., from operator A to operator B) and retain their user identifier. According to one exemplary embodiment, an identity server can support reverse lookup ENUM usage for URI and other identity correlation, although other suitable network identity mapping mechanisms can be used. Thus, all communication contacts that the user had while with operator A can seamlessly continue communications with the user even after the user switches to operator B, even though the user has changed, for example, their phone number or other addressing or routing information.

Figure 2:
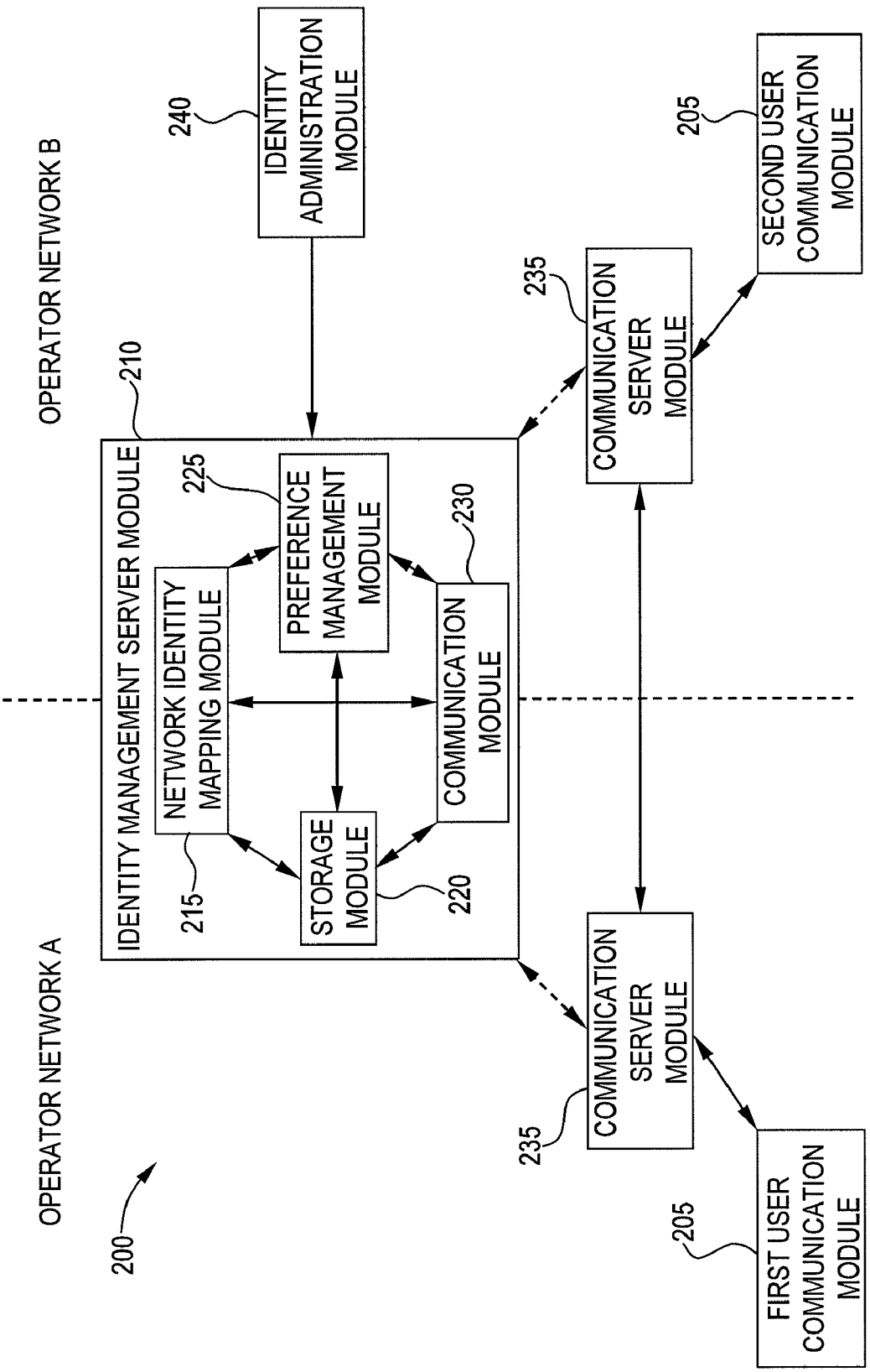
FIG. 2 is a block diagram illustrating a system for identity portability across communication systems, in accordance with an exemplary embodiment of the present invention.

These and other aspects and embodiments of the present invention will now be described in greater detail. FIG. 2 is a block diagram illustrating a system 200 for identity portability across communication systems, in accordance with an exemplary embodiment of the present invention. The system 200 includes user communication modules 205, such as first and second user communication modules 205. However, any suitable number of user communication modules 205 (e.g., user communication module 1, user communication module 2, user communication module 3, . . . , user communication module N, where N is any appropriate number) can be used with the system 200 in accordance with exemplary embodiments of the present invention. Each user communication module 205 can comprise any suitable type of wireless or wired communication module or device that is capable of receiving and transmitting messages and other information using any appropriate type of communication service. For example, each of the user communication modules 205 can comprise a mobile device, a personal computer (PC), or the like.

A unique network identity can be associated with each of the user communication modules 205. According to exemplary embodiments, each network identity can be comprised of any suitable type of identifier that is capable of uniquely identifying the user of the user communication module 205. For purposes of illustration and not limitation, the network identity can comprise, for example, a Session Initiation Protocol (SIP) Uniform Resource Identifier (URI), an E. 164 number, a Mobile Station International Subscriber Directory Number (MSISDN), a presence URI, an Instant Messaging (IM) URI, an eXtensible Resource Identifier (XRI) i-name, a Wireless Village ID, and an Extensible Messaging and Presence Protocol (XMPP) ID, an alphanumeric string of characters, or any other suitable type of identifier. For example, a first network identity can be associated with the first user communication module 205, and a second network identity can be associated with the second user communication module 205. Each such network identity uniquely identifies the user of the respective user communication module 205.

Each user communication module 205 is configured to utilize the communication services provided by a communication service operator. For example, the first user communication module 205 is configured to utilize a first communication service provided by a first communication service operator. A first network address is associated with the first network identity for addressing communications to the first network identity via the first communication service. In other words, communications directed to the first network identity of the user would be addressed to the first network address so that those communications would arrive at the first user communication module 205. In the present illustration, the second user communication module 205 can utilize the communication services provided by a communication service operator (represented as operator network B in FIG. 2) that is different than the communication services and communication service operator utilized by the first user communication module 205. The network addresses can comprise any suitable type of address or other like information that is capable of uniquely specifying the network location of the user communication module 205, such as, for example, a URI, a URL, an IP address, or other like addressing information.

Figure 1:
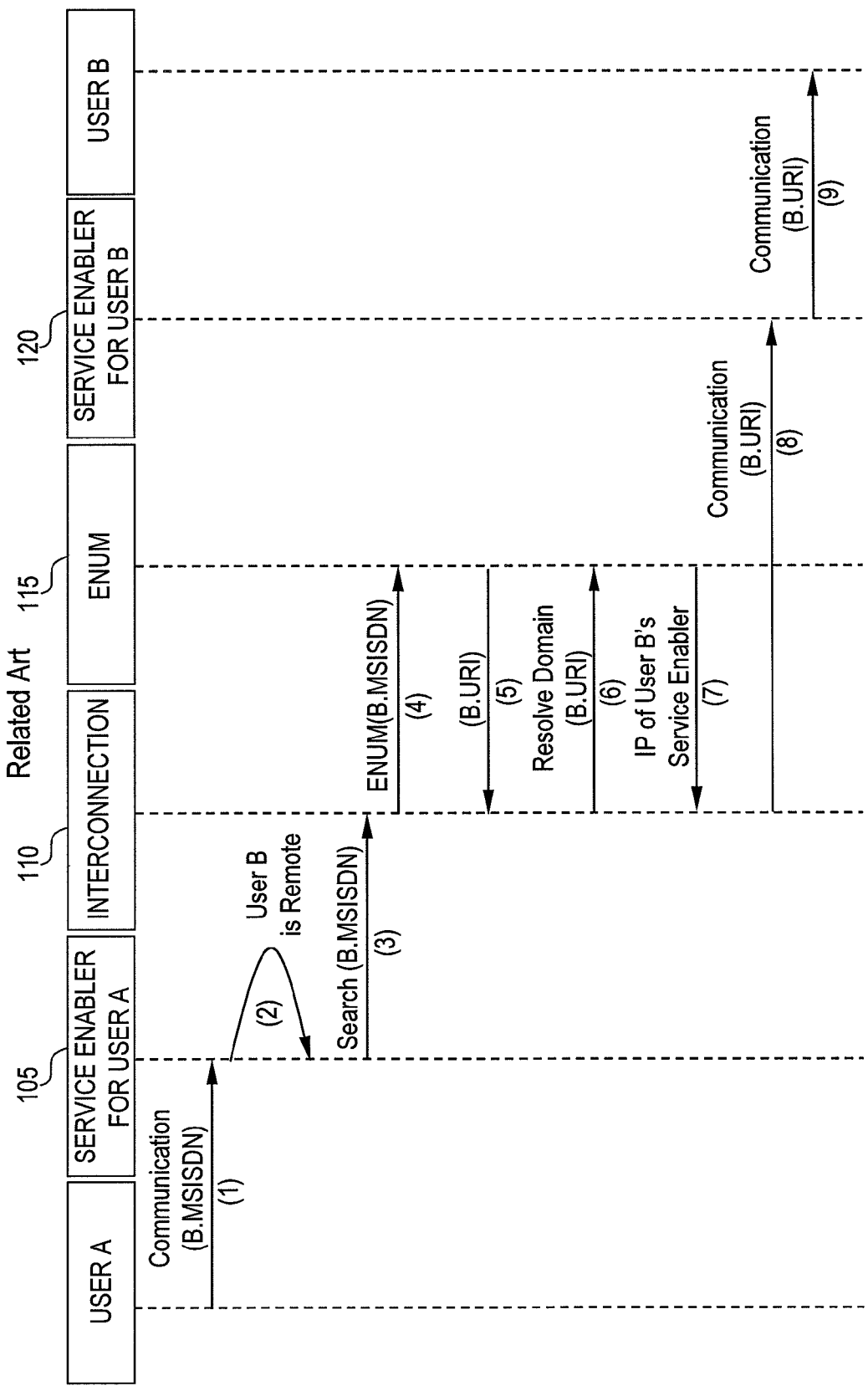
FIG. 1 is a diagram illustrating a message flow for a communication transaction between User A and User B belonging to different operators.

The user of the first user communication module 205 can thereafter switch communication service operators at any time and for any reason. Thus, the first user communication module 205 can be switched to utilize a second communication service provided by a second communication service operator. For purposes of illustration and not limitation, the new, second communication service operator can be represented as operator network A in FIG. 1. Accordingly, a second network address can be associated with the first network identity for addressing communications to the first network identity via the second communication service. In other words, since the user has switched communication service operators, communications directed to the first network identity of the user should be addressed to the second network address so that those communications arrive at the first user communication module 205. After such switching, communications sent to the first network identity associated with the first user communication module 205 by using the first network address would fail (as the first network address is no longer valid) if exemplary embodiments of the present invention were not used.

However, according to exemplary embodiments, the first network identity can be ported or otherwise transferred to the new communication service operator without the need for obtaining a new network identity. Accordingly, the system 200 includes an identity management server module 210 in communication with the user communication modules 205. The identity management server module 210 is configured to map the first network address to the second network address for communications addressed to the first network identity at the first network address. For example, the first network address can comprise a previous or old network address associated with the first network identity, and the second network address can comprise a current or new network address associated with the first network identity.

The identity management server module 210 need not reside or be located in any particular communication service network. For example, as illustrated in FIG. 2, the identity management server module 210 can be located "between" or "outside" communication networks, such as operator network A and operator network B. Alternatively, one or more identity management server modules 210 can be located within any one or more networks. Operator networks A and B can each comprise any suitable type of wireless and/or wired communication network. For example, each of operator networks A and B can be operated or otherwise managed by any appropriate type of network operator, including, but not limited to a Mobile Network Operator (MNO), a mobile virtual network operator, a wireless service provider, a wireless carrier, a mobile phone operator, a cellular company or organization, a fixed network operator, a converged network operator, or any suitable combination thereof. Skilled artisans will recognize that any suitable number (e.g., operator network 1, operator network 2, operator network 3, . . . , operator network M, where M is any appropriate number) and kinds (e.g., wired, wireless, or combination thereof) of networks can be used with system 200 in accordance with exemplary embodiments.

To facilitate the mapping between network addresses, the identity management server module 210 includes a network identity mapping module 215. The network identity mapping module 215 can be configured to map or otherwise correlate the first network address with the second network address for each network identity, such as in the manner described below. Accordingly, the identity management server module 210 can include a database or storage module 220. The storage module 220 can be configured to store the mappings of the first network address to the second network address for each network identity, as well as other suitable information used or maintained by the identity management server module 210. The storage module 220 can be comprised of any suitable type of computer-readable or other computer storage medium capable of storing information in electrical or electronic form.

When a user switches operators, privacy issues may be implicated. For example, the user may have switched communication service operators to prevent certain individuals or groups of individuals from further contacting the user. In such circumstances, although the user may desire for their network identity to be ported to the new operator, the user may not wish for the system 200 to perform address mapping. Accordingly, the identity management server module 210 can include a preference management module 225. The preference management module 225 can be configured to manage preferences associated with the users of the system 200. Any suitable preferences can be managed by the preference management module 225, and any such preference information can be stored or otherwise maintained in, for example, the storage module 220 with which the preference management module 225 can be in communication.

For purposes of illustration and not limitation, the user can specify a preference to block a particular communication transaction, not perform the network address mapping, and/or not provide the network identity to protect the privacy of the user after switching operators. Depending on the preferences of the user, such privacy can be maintained against certain individuals or entities, groups of individuals or entities, entire domains, or the like, while allowing other individuals, groups, or entities to contact the user via the user's network identity. For example, a user can participate in a "family phone plan" offered by a communication service provider, and the members of that plan can contact the user via the user's network identity. The user can then switch communication service providers and receive a new telephone number while maintaining their network identity. The user can specify a preference that the remaining members of the family plan can contact the user using the network identity, with the exception of the user's in-laws (e.g., network address mapping is not to be performed for those individuals). If those in-laws try to contact the user at the user's network identity after the switch, an error or other inability-to-connect message can be returned to the in-laws. Accordingly, the identity management server module 210 (e.g., using the network identity mapping module 215 in communication with the preference management module 225) can be configured to block mapping of the first network address to the second network address to maintain privacy of the network identity after switching communication services to another communication service operator.

The preference management module 225 can also be used to manage preferences from other entities that use or are otherwise associated with the system 200, such as one or more communication service operators. Such operators can establish appropriate preferences or policies that are applicable to individual users or groups of users, all of which can be managed and maintained according to exemplary embodiments. For example, an operator can establish a preference or policy that the identity management server module 210 is to return the second network address of the network identity when queried with the first network address of the network identity. Such information can be used by the originator of the message or communication to update their contact information for the user to whom the message was sent. The updated information can be used by the originator to reissue or otherwise resend the message with the updated address information. However, the operator can specify a preference or policy that the returned second network address does not include an indication of the network identity associated with the second network address (e.g., such information is hidden or otherwise not revealed), for example, to maintain privacy of the users. Those of ordinary skill in the art will recognize that the manner of communicating the network address and identity information by the identity management server module 210 will depend on many factors, including, but not limited to, the operator policies, user privacy policies, the contacts that communicate with the user, and other like factors.

The identity management server module 210 can include a communication module 230. The communication module 230 is configured to communicate network address information associated with each network identity. However, each of the modules of the identity management server module 210 can use the communication module 230 to communicate any suitable type of information to, for example, users, message originators, operators, and other entities using or otherwise associated with the system 200. The communication module 230 can be adapted to use any suitable type of wireless or wired communication link, connection, or medium that uses an appropriate form of wireless or wired communication mechanism, protocol, or technique, or any suitable combination thereof, to communicate with the various entities of the system 200. For example, the communication module 230 can be used to communicate with different entities using different communication protocols or services (e.g., by identifying the protocol or service being used by the entity). In other words, the communication module 230 can be configured to use any or all of a plurality of communication access protocols to support various suitable types of networks, security settings, communication environments, and the like.

The system 200 can include additional modules, devices, and other components to facilitate communication transactions within the system 200. For example, the system 200 can include communication server modules 235. Each communication server module 235 can be in communication with the identity management server module 210, with the respective first and second user communication modules 205, and with each other (and other like modules) to facilitate communication transactions throughout the system 200. In particular, the communication server modules 235 can be configured to query the identity management server module 210 for network address information associated with a network identity. In other words, the communication server modules 235 can be configured to query the identity management server module 210 for the network address associated with a particular network identity. The number and type of such communication server modules 235 will depend on the type of communication services offered in each operator network. For example, each communication server module 235 can comprise a suitable type of service enabler, such as, for example, an IM Service Center (e.g., an IM enabler), a Short Message Service Center (SMSC), or the like.

According to an exemplary embodiment, the network identity mapping module 215 can be configured to map the first network address to the second network address in any suitable manner. According to one exemplary embodiment, the network identity mapping module 215 can include or retrieve information from appropriate look-up tables that can map the first network address to the second network address for each network identity. Such look-up tables can be stored in a suitable computer memory or other computer storage device internal to or in communication with the network identity mapping module 215 (e.g., in the storage module 220). For purposes of illustration and not limitation, Table 1 illustrates an exemplary lookup table that can be used to map the first network address to the second network address for each network identity.

TABLE 1

Exemplary mapping of old network address to new network address to facilitate network identity portability.

| NETWORK IDENTITY | OLD NETWORK ADDRESS | NEW NETWORK ADDRESS |
|---|---|---|
| first network identity | NETWORK_ADDR_0 | NETWORK_ADDR_A |
| second network identity | NETWORK_ADDR_B | NETWORK_ADDR_B |

In Table 1, the first network identity has an "old" (i.e., first) network address of "NETWORK_ADDR_0" (an address associated with the user's previous communication service operator) and a "new" (i.e., second) network address of "NETWORK_ADDR_A," representing an address associated with operator network A. The second network identity, however, has the same network address (of "NETWORK_ADDR_B") for both "old" and "new," as the user of the second user communication module 205 has not yet switched communication service operators. Using a lookup table such as that illustrated in Table 1, the network identity mapping module 215 can obtain the updated address information for communications addressed to the first network identity at the first (old) network address so that those communications arrive at the first user communication module 205 in operator network A (i.e., at the second network address of "NETWORK_ADDR_A"). Such a lookup table can be configured to maintain any suitable number of network identities, depending on the number of users of the system 200, and any suitable number of "old" address, depending on how many times users switch operators. Additionally, as skilled artisans will recognize, the nature and content of the information contained in such a look-up table and the mapping of the first network addresses to the second network addresses will depend on, for example, the nature and type of the addressing information, the nature and type of the network identities, the number of such network identities, and other like factors.

Alternatively, suitable Boolean or other logic or rules can be used to map the first network address to the second network address for each network identity. For example, continuing with the present illustration, Boolean logic can be used to determine that IF a communication is addressed to the first network identity at first network address "NETWORK_ADDR_0," THEN use the second network address of "NETWORK_ADDR_A." Likewise, Boolean logic can be used to determine that IF a communication is addressed to the second network identity at the first network address of "NETWORK_ ADDR_B," THEN use the address of "NETWORK_ ADDR_B." The complexity of such logic or rules will depend on the nature and type of addressing information, as well as other like factors. More complex mechanisms, such as neural networks, can be adapted to "learn" how to respond to such presence information. For example, according to an exemplary embodiment, the network identity mapping module 215 can "learn" that communications addressed to first network address of the first network identity are to be sent to the second network address of "NETWORK_ADDR_A." Such information can be fed back to the network identity mapping module 215 to allow such "learning" to take place and to refine these or other network address mapping algorithms.

Figure 6:
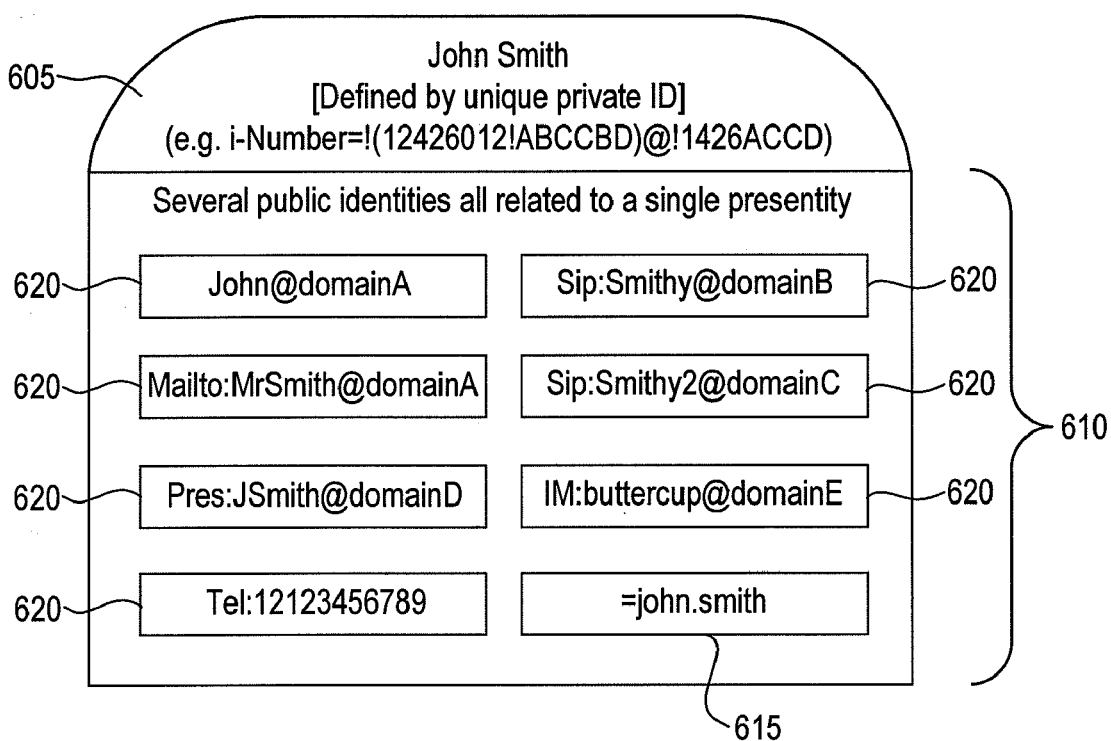
FIG. 6 illustrates the plurality of addresses that can be maintained for each network identity, in accordance with an exemplary embodiment of the present invention.

Thus, according to an exemplary embodiment, the history of "old" addresses that have been associated with a particular network identity can be maintained (e.g., the address(es) associated with the user's previous communication service operator(s)), along with the current or "new" address associated with that network identity (e.g., the address associated with the user's current communication service operator). By maintaining such information on past and current addresses associated with a network identity, the "new" address associated with the network identity can be located by providing any one of the "old" addresses that have previously been associated with that network identity. For example, FIG. 6 illustrates the plurality of addresses that can be maintained for each network identity, in accordance with an exemplary embodiment of the present invention. In particular, user "John Smith" is identified by a unique network identity 605. For purposes of illustration and not limitation, the network identity 605 for John Smith can comprise an XRI i-Number, such as, for example, "!(12426012!ABCCBD)@!(1426ACCD)." The history of associated addressing information 610 can be maintained for user John Smith. For example, the current address 615 associated with John Smith's network identity 605 can be "=john.smith." All of the previous or old addresses 620 that were associated with John Smith's network identity 605 can be maintained in the addressing information 610. By providing any one or more of these old addresses 620, the current address 615 associated with John Smith's network identity 605 can be ascertained. For example, if another user sends an IM message to John Smith's network identity 605 at the old address 620 of "buttercup@domainE," the network identity mapping module 215 can use such information to retrieve the current address 615 associated with that network identity 605 (i.e., "=john.smith"). With the current address 615 so obtained, the IM message can be properly routed to John Smith. In the present illustration, it is noted that the user sending the message is unaware that such mapping has taken place, even though the message was sent to an outdated address associated with John Smith's network identity 605.

Thus, according to exemplary embodiments, any suitable mechanism can be used in which, for example, a list of all URIs and MSISDNs is maintained so as to allow association of "old" URIs with "new" URIs to facilitate portability of the user's network identity. Merely for purposes of illustration and not limitation, the network identity mapping module 215 can provide such user identity portability based on, for example, a "reverse" lookup ENUM usage. For example, the network identity mapping module 215 can allow a user to maintain their E.164 phone number, then switch communication service operators, and all contacts that directly used any URI to send communications to the user can still communicate with that user after switching operators. Accordingly, the network identity mapping module 215 can store the previous or old ENUM mapping of the E.164 phone number to the old URI, and the new ENUM mapping of the E.164 phone number to the new URI (e.g., in the storage module 220).

Figure 3:
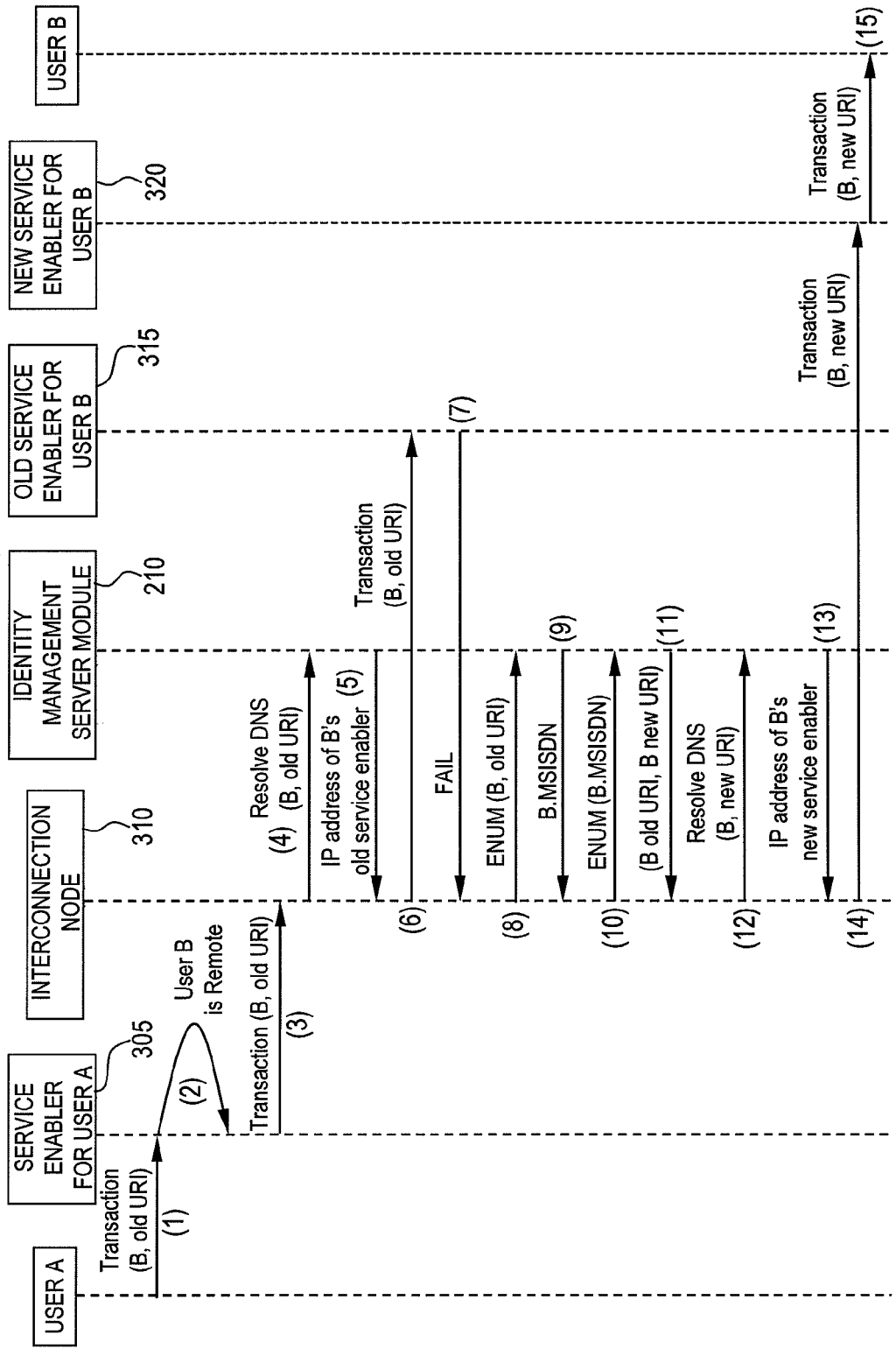
FIG. 3 is a diagram illustrating a message flow for a communication transaction between User A and User B belonging to different operators that supports user identity portability, in accordance with an exemplary embodiment of the present invention.

For example, FIG. 3 is a diagram illustrating a message flow for a communication transaction between User A and User B belonging to different operators that supports user identity portability, in accordance with an exemplary embodiment of the present invention. A unique network identity is associated with each of User A and User B. In the scenario illustrated in FIG. 3, User B has switched communication service operators and maintained its unique network identity, User A is unaware of the switch, and User A desires to send a communication transaction to the network identity of User B at the "old" URI of User B. In step 1, the communication transaction is transmitted to the service enabler 305 (e.g., a communication server module 235) for User A, including the destination network address information (User B at old URI). In step 2, the service enabler 305 determines that User B is a remote user (e.g., based on the URI of User B). Accordingly, in step 3, the service enabler 305 forwards the communication transaction, including the destination network address information (User B at old URI), to a suitable interconnection node 310 that interconnects the networks of the operators for User A and User B.

To resolve the network address of User B, the interconnection node 310 forwards a DNS query (with the old URI of User B) to the identity management server module 210 in step 4. In step 5, the identity management server module 210 returns the IP address of User B's old or previous service enabler 315 (e.g., a communication server module 235). In step 6, the interconnection node 310 uses the returned IP address to transmit the communication transaction to the old service enabler 315 for User B. However, since User B has switched operators, the old service enabler 315 for User B returns a "FAIL" or other like failure message in step 7, as the old URI is no longer valid. In step 8, the interconnection node 310 sends an ENUM query (with the old URI of User B) to the identity management server module 210. The identity management server module 210 can be configured to handle the ENUM query itself (e.g., using the network identity mapping module 215), or to pass along the query to a suitable ENUM server in communication with the identity management server module 210. Under either embodiment, the identity management server module 210 can return the MSISDN of User B back to the interconnection node 310 in step 9. In the present illustration, the MSISDN can comprise the network identity of User B.

In step 10, the interconnection node 310 can forward another ENUM query (now with the network identity MSISDN of User B) to the identity management server module 210. In step 11, the identity management server module 210 can return the mapping of the old URI to the new URI (i.e., the mapping of the first network address to the second network address) for User B in accordance with the network identity of User B (i.e., its MSISDN), in the manner described previously. In step 12, the interconnection node 310 can send a request to the identity management server module 210 (with the updated URI information) to resolve the address of the new URI. In step 13, the identity management server module 210 can return the IP address of the new service enabler 320 for User B (e.g., a communication server module 235). In step 14, the interconnection node 310 can forward the communication transaction to the new service enabler 320 for User B. In step 15, the new service enabler 320 can forward the communication transaction to User B. Thus, according to exemplary embodiments, User B can change operators but maintain the same network identity, and User A can still communicate with User B even when User A sends those communications to the old network address of User B.

Various alternative methods of supporting identity portability according to exemplary embodiments can also be used, instead of the ENUM and DNS queries and the mapping between URI and MSISDN demonstrated in the scenario illustrated in FIG. 3. For example, suitable non-ENUM based methods can be used for resolving the new network address associated with a particular network identity. Such methods can incorporate database, document, directory, or other suitable information formats that are capable of storing and allowing retrieval of appropriate mapping information. Additionally or alternatively, rather than failing (see step 7 in FIG. 3) and then obtaining the new URI (see steps 8-11 of FIG. 3), the interconnection node 310 can proactively query the identity management server module 210 to obtain the new network address (e.g., the new URI of User B) to reduce the number of queries and responses. Instead of the mapping between URI and MSISDN that took place in the scenario of FIG. 3, the network identities can be correlated with the network addresses beforehand (e.g., by the network identity mapping module 215) and stored (e.g., in the storage module 220) for later retrieval, such as in the form of the lookup tables discussed previously. In each of these methods, the selection of the most updated network address can be made in accordance with a timestamp (e.g., the most recent URI is selected), comparison to an existing (e.g., failed) network address (e.g., chose the URI that has not resulted in a communication failure), or by any other suitable mechanism or means.

Those of ordinary skill in the art will recognize that each of the modules of the system 200 can be located locally to or remotely from each other, while use of the system 200 as a whole still occurs within a given country, such as the United States. For example, merely for purposes of illustration and not limitation, the identity management server module 210 (including the network identity mapping module 215, the storage module 220, the preference management module 225, and the communication module 230) can be located extraterritorially to the United States (e.g., in Canada and/or in one or more other foreign countries). However, the user communication modules 205 (and the communication server modules 235) can be located within the United States, such that the control of the system 200 as a whole is exercised and beneficial use of the system 200 is obtained by the user within the United States.

Each of modules of the system 200, including the user communication modules 205, the identity management server module 210 (including the network identity mapping module 215, the storage module 220, the preference management module 225, and the communication module 230), and the communication server modules 235, or any combination thereof, can be comprised of any suitable type of electrical or electronic component or device that is capable of performing the functions associated with the respective element. According to such an exemplary embodiment, each component or device can be in communication with another component or device using any appropriate type of electrical connection or communication link (e.g., wireless, wired, or a combination of both) that is capable of carrying such information. Alternatively, each of the modules of the system 200 can be comprised of any combination of hardware, firmware and software that is capable of performing the functions associated with the respective module.

Alternatively, each, any, or all of the components of the system 200 (including the user communication modules 205, the identity management server module 210, and the communication server modules 235) can be comprised of one or more microprocessors and associated memory(ies) that store the steps of a computer program to perform the functions of one or more of the modules of the system 200. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming to perform the functions of one or more of the modules of the system 200. For example, the actual source code or object code of the computer program can be stored in the memory.

The system 200 can include suitable additional modules as necessary to assist or augment the functionality of any or all of the modules of the system 200. For example, the system 200 can include an identity administration module 240 in communication with the identity management server module 210 (e.g., via the communication module 230). For example, such an identity administration module 240 can be configured to manage the network identity mapping information and preferences used and maintained by the identity management server module 210. The identity administration module 240 can be used by, for example, a service provider, a system administrator, operator, or the like to manage and maintain any or all aspects of the identity management server module 210. According to an exemplary embodiment, the identity administration module 240 can be operated by a (remote, external) third party to register and maintain the network identities. For example, such an identity administration module 240 can be used to sell network identities to users. The cost of the each network identity can be proportional to the simplicity or complexity of the desired network identity. For example, a popular network identity, such as a first name like "John" or "Jane," can be considered expensive and can be sold at a higher cost due to its simplicity (e.g., it is easy to remember). However, a more unique network identity, such as an alphanumeric string of characters like "John.Smith08172007," can be considered less expensive and can be sold at a lower cost due to its complexity and uniqueness (e.g., it is more difficult to remember). Once registered, the network identity and associated address information can be passed from the identity administration module 240 to the identity management server module 210 to facilitate the network identity mapping discussed herein.

The system 200 can include additional database or storage modules that can be in communication with, for example, the identity management server module 210. Such storage modules can be configured to store any suitable type of information generated or used by or with the system 200. The storage modules can be comprised of any suitable type of computer-readable or other computer storage medium capable of storing information in electrical or electronic form.

Alternative architectures or structures can be used to implement the various functions of the system 200 as described herein. For example, functions from two or more modules can be implemented in a single module, or functions from one module can be distributed among several different modules. For example, the preference management module 225 can form a component of the network identity mapping module 215, such that the network identity mapping module 215 is configured to perform the functionality of that (incorporated) module.

Figure 4:
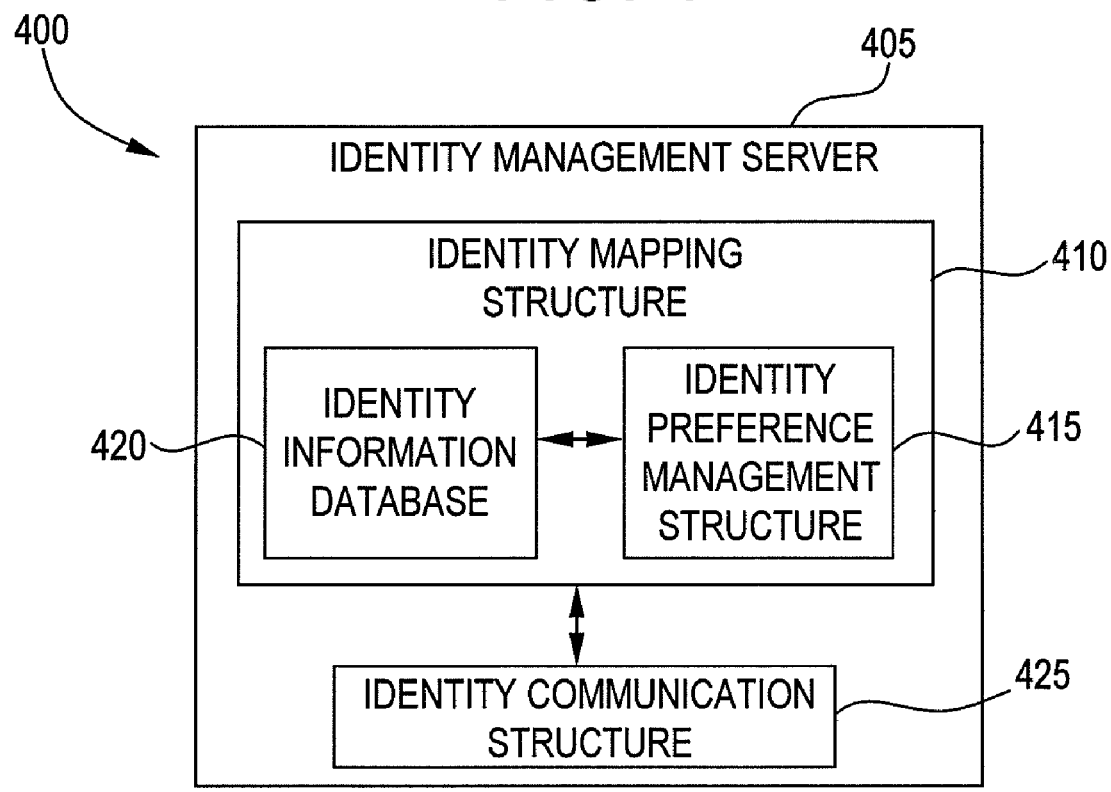
FIG. 4 is a block diagram illustrating an apparatus for network identity portability, in accordance with an alternative exemplary embodiment of the present invention.

For purposes of illustration and not limitation, FIG. 4 is a block diagram illustrating an apparatus 400 for network identity portability, in accordance with an alternative exemplary embodiment of the present invention. The apparatus 400 includes an identity an identity management server 405. The identity management server 405 is adapted to communicate with one or more user communication devices. For example, a user communication device can be adapted to utilize communication services of a first communication network. A network identity is associated with the given user communication device. A first network address is associated with the network identity for addressing communications to the network identity via the first communication network. Subsequently, the user communication device switches operators to utilize communication services of a second communication network. As a result, a second network address is associated with the network identity for addressing communications to the network identity via the second communication network. Accordingly, the identity management server 405 includes identity mapping structure 410. The identity mapping structure 410 is adapted to correlate the first network address to the second network address for communications addressed to the network identity at the first network address (e.g., in a manner similar to that described previously for the network identity mapping module 215).

The identity mapping structure 410 includes identity preference management structure 415. The identity preference management structure 415 is adapted to manage preference information associated with network identities (e.g., in a manner similar to that described previously for the preference management module 225). The identity mapping structure 410 also includes an identity information database 420. The identity information database 420 is adapted to store information associated with network identities (e.g., in a manner similar to that described previously for the storage module 220). In addition, the identity management server 405 includes identity communication structure 425 in communication with the identity mapping structure 410. The identity communication structure 425 is adapted to communicate information associated with network identities (e.g., in a manner similar to that described previously for the communication module 230).

The exemplary and alternative exemplary embodiments illustrated in FIGS. 2 and 4 can provide centralized identity portability management. However, the functionality of the identity management server module 210 (or the identity management server 405) can instead reside in one or more of the respective communication server modules 235 (e.g., to facilitate transfer or distribution of network identity mapping information between communication server modules 235). Alternatively, the functionality of the identity management server module 210 (or the identity management server 405) can be distributed between a central server and the communication server modules 235 (or other components). Other alternative architectures or structures can be used to implement the various functions of the system 200 and the apparatus 400 as described herein.

Figure 5:
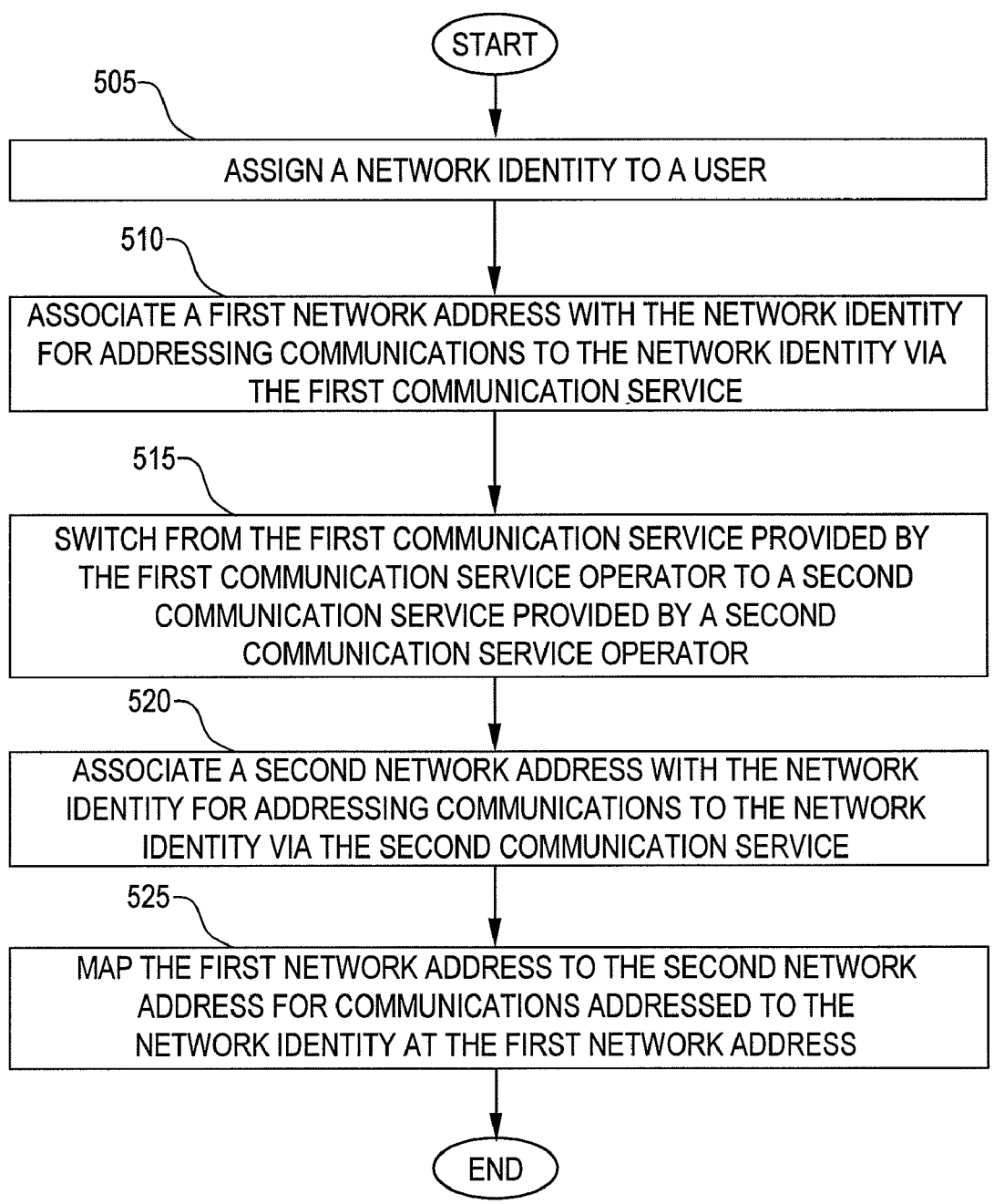
FIG. 5 is a flowchart illustrating steps for porting network identities across communication systems, in accordance with an exemplary embodiment of the present invention.

FIG. 5 is a flowchart illustrating steps for porting network identities across communication systems, in accordance with an exemplary embodiment of the present invention. In step 505, a network identity is assigned to a user. The user communicates information utilizing a first communication service provided by a first communication service operator. In step 510, a first network address is associated with the network identity for addressing communications to the network identity via the first communication service. In step 515, the user switches from the first communication service provided by the first communication service operator to a second communication service provided by a second communication service operator. In step 520, a second network address is associated with the network identity for addressing communications to the network identity via the second communication service. In step 525, the first network address is mapped to the second network address for communications addressed to the network identity at the first network address.

The method can include the step of correlating the first network address with the second network address for network identities. The mappings of the first network address to the second network address can be stored for network identities. The method can include one or more of the following steps: managing preferences associated with users of the system; communicating network address information associated with network identities; and returning the second network address of the network identity when queried with the first network address of the network identity.

According to an exemplary embodiment, a communication contact for the network identity can be updated with the returned second network address. However, the returned second network address need not include an indication of the network identity associated with the second network address. To maintain the privacy of the user, the method can include the step of: blocking mapping of the first network address to the second network address to maintain privacy of the network identity after switching to the second communication service provided by the second communication service operator. The method can also include the step of: generating a query for network address information associated with the network identity.

Each, all or any combination of the steps of a computer program as illustrated in, for example, FIG. 5 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Exemplary embodiments of the present invention can be used in conjunction with any wireless or wired device, system or process for communicating information. For example, exemplary embodiments can be used in presence-based communication systems, such as in mobile and fixed IM systems and the like.

It will be appreciated by those of ordinary skill in the art that the present invention can be embodied in various specific forms without departing from the spirit or essential characteristics thereof. The presently disclosed embodiments are considered in all respects to be illustrative and not restrictive.

The scope of the invention is indicated by the appended claims, rather than the foregoing description, and all changes that come within the meaning and range of equivalence thereof are intended to be embraced.

All United States patents and patent applications, foreign patents and patent applications, and publications discussed above are hereby incorporated by reference herein in their entireties to the same extent as if each individual patent, patent application, or publication was specifically and individually indicated to be incorporated by reference in its entirety.

What is claimed is:

1. A system for identity portability across communication systems, comprising:

a user communication module, wherein the user communication module is configured to utilize a first communication service provided by a first communication service operator, wherein a network identity is associated with the user communication module, wherein a first network address is associated with the network identity for addressing communications to the network identity via the first communication service, wherein the user communication module is switched to utilize a second communication service provided by a second communication service operator, and wherein a second network address is associated with the network identity for addressing communications to the network identity via the second communication service; and an identity management server module in communication with the user communication module, wherein the identity management server module is configured to map the first network address to the second network address for communications addressed to the network identity at the first network address, wherein the identity management server module is configured to block mapping of the first network address to the second network address to maintain privacy of the network identity after switching to the second communication service provided by the second communication service operator.

2. The system of claim 1, wherein the first network address comprises a previous network address associated with the network identity, and wherein the second network address comprises a current network address associated with the network identity.

3. The system of claim 1, wherein the identity management server module comprises:

a network identity mapping module, wherein the network identity mapping module is configured to correlate the first network address with the second network address for each network identity.

4. The system of claim 1, wherein the identity management server module comprises:

a storage module, wherein the storage module is configured to store mappings of the first network address to the second network address for each network identity.

5. The system of claim 1, wherein the identity management server module comprises:

a preference management module, wherein the preference management module is configured to manage preferences associated with users of the system.

6. The system of claim 1, wherein the identity management server module comprises:
a communication module,
wherein the communication module is configured to communicate network address information associated with each network identity.

7. The system of claim 1, wherein the identity management server module is configured to return the second network address of the network identity when queried with the first network address of the network identity.

8. The system of claim 7, wherein a communication contact for the network identity is updated with the returned second network address.

9. The system of claim 7, wherein the returned second network address does not include an indication of the network identity associated with the second network address.

10. The system of claim 1, comprising:
a communication server module in communication with the identity management server module,
wherein the communication server module is configured to query the identity management server module for network address information associated with the network identity.

11. The system of claim 1, wherein the network identity comprises one of a Session Initiation Protocol (SIP) Uniform Resource Identifier (URI), an E.164 number, a Mobile Station International Subscriber Directory Number (MSISDN), a presence URI, and an instant messaging (IM) URI.

12. The system of claim 1, wherein at least one of the first and second network addresses comprise a Uniform Resource Identifier (URI).

13. A method of porting network identities across communication systems, the method being performed by an identity management server module, and the method comprising the steps of:
a.) assigning a network identity to a user, wherein the user communicates information utilizing a first communication service provided by a first communication service operator;
b.) associating a first network address with the network identity for addressing communications to the network identity via the first communication service;
c.) switching from the first communication service provided by the first communication service operator to a second communication service provided by a second communication service operator;
d.) associating a second network address with the network identity for addressing communications to the network identity via the second communication service; and
e.) mapping the first network address to the second network address for communications addressed to the network identity at the first network address; and
f.) blocking mapping of the first network address to the second network address to maintain privacy of the network identity after switching to the second communication service provided by the second communication service operator.

14. The method of claim 13, wherein the first network address comprises a previous network address associated with the network identity, and
wherein the second network address comprises a current network address associated with the network identity.

15. The method of claim 13, further comprising the step of:
g.) correlating the first network address with the second network address for network identities.

16. The method of claim 13, further comprising the step of:
g.) storing mappings of the first network address to the second network address for network identities.

17. The method of claim 13, further comprising the step of:
g.) managing preferences associated with users of the system.

18. The method of claim 13, further comprising the step of:
g.) communicating network address information associated with network identities.

19. The method of claim 13, further comprising the step of:
g.) returning the second network address of the network identity when queried with the first network address of the network identity.

20. The method of claim 19, wherein a communication contact for the network identity is updated with the returned second network address.

21. The method of claim 19, wherein the returned second network address does not include an indication of the network identity associated with the second network address.

22. The method of claim 13, further comprising the step of:
g.) generating a query for network address information associated with the network identity.

23. The method of claim 13, wherein the network identity comprises one of a Session Initiation Protocol (SIP) Uniform Resource Identifier (URI), an E.164 number, a Mobile Station International Subscriber Directory Number (MSISDN), a presence URI, an instant messaging (IM) URI, an eXtensible Resource Identifier (XRI) i-name, a Wireless Village ID, and an Extensible Messaging and Presence Protocol (XMPP) ID.

24. The method of claim 13, wherein at least one of the first and second network addresses comprises a Uniform Resource Identifier (URI).

\* \* \* \* \*